N. B. MARSH.
Preserving Meat.
No. 22,185.
Patented Nov. 30, 1858.
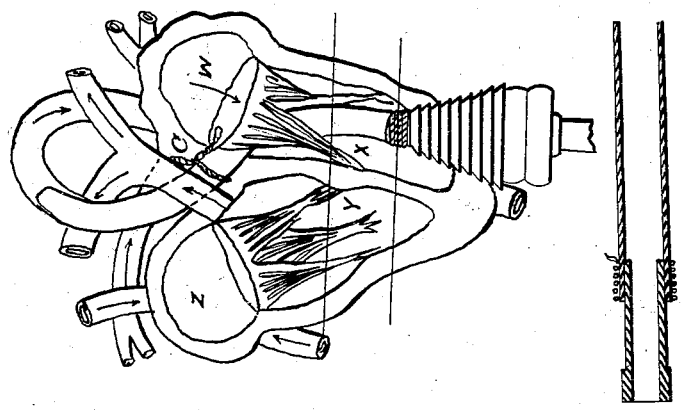
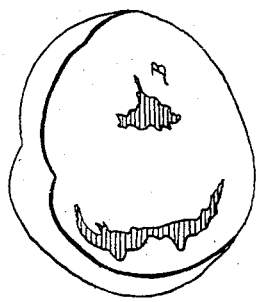
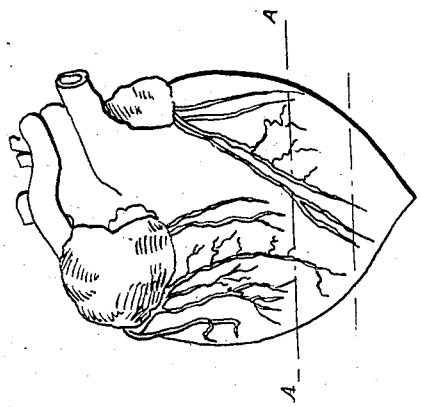
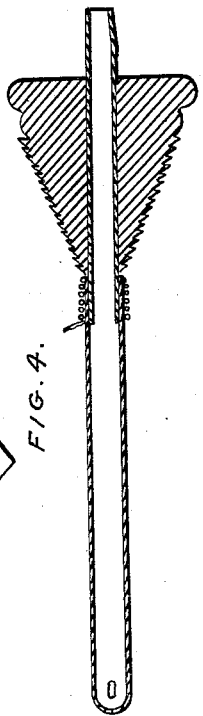
INVENTOR
Nathen B Marsh

UNITED STATES PATENT OFFICE.

NATHAN B. MARSH, OF CINCINNATI, OHIO.

PRESERVATION OF FLESH FOR FOOD.

Specification of Letters Patent No. 22,185, dated November 30, 1858.

*To all whom it may concern:*

Be it known that I, NATHAN B. MARSH, of the city of Cincinnati, county of Hamilton, State of Ohio, have invented a new and improved process whereby live stock—such as beef-cattle, sheep, and hogs—may be speedily converted into cured meats for the market; and I do hereby declare that the following is a full and exact description thereof, reference being had to the accompanying drawings and specification.

Heretofore inattention to or ignorance of the anatomy and physiology of the circulation of animals, has been one grand obstacle to the successful employment of the means whereby animal bodies can be preserved by injecting preserving fluid into the arteries. The animals have been killed in such manner that so many large vessels were wounded that it was impossible to tie them without great loss of time; and in operating to bleed, such extremely vascular tissues were divided, that no means could be adopted to prevent the injected fluid from escaping from the arteries so freely as often to entirely defeat the object of the operator. In operating to inject a fluid into the arteries of animals and more especially a cold and refrigerant fluid it is indispensable, that no considerable leak should exist from the arterial trunks. The reason is obvious. The capillaries are constringed by the cold, and resist the passage of a cold and saline solution with much greater force than the blood; hence we find that the coats of the arteries are unusually strained and disposed to relieve themselves at the point where their branches are cut or divided. Another cause which has operated to prevent the process of curing meats by injection of saline fluids into the arteries from having been known to the public, and has consigned the remembrance of the process and its use to oblivion, is owing to the fact that salt and saline solutions do not arrest decomposition in animal matters independent of temperature. It is only by the speedy abstraction of the heat of the animal body that salt will act upon the tissues in such manner as to preserve them sweet.
This difficulty is completely met by my process so as to insure complete and absolute security to the curer.

The nature of my invention consists in the process or any essential part thereof as herein described for converting live stock, such as beef cattle, hogs and sheep, or the hams or rounds, thereof into cured and smoked meats for the market; so that such live stock may be slaughtered in any numbers, in any climate, in any season of the year, with success, certainty, facility, and economy.

In order that my process may be so conducted, I will explain the first part of my process.

After making the animal insensible by a blow upon the head, if the animal is a hog, cut down through the integuments, in or near the median line of the anterior parietes of the thorax, the whole length, or near the whole length of the sternum, then open the chest by cutting through the walls, at or near the median line, and divide the pericardium and expose the heart. This I consider an essential part of my process. The next part of my process is to bleed the animal by cutting off the point of the heart in the line A of the drawings. Or if I do not wish to wound the heart which is sometimes very desirable for the reasons hereafter given, I bleed the animal by puncturing or slitting the pulmonary artery just above the right ventricle, or I puncture or slit the una cara just above the right auricle, or I thrust a common trocar into the right ventricle; this may wound the heart but will not allow any blood to escape should the coronary branches be wounded by its introduction— the trocar will allow the blood to flow away from the venous system. This I consider an essential part of my process. When the incisions slits puncture are thus made, or the cannula of a trocar is introduced as described, the blood runs from the animal. A modification of this part of my process, and a very good one for such animals as do not require to be singed or scalded, is, to open the abdomen of the animal in or near the median line; the cut may be extended a convenient distance from the putus toward the sternum. If the animal is hanging by the hind legs, draw the intestines to one side or downward; then the una cara will be seen near the backbone and the artery near it. The una cara can be distinguished by its blue or purplish color shining through the coating of peritoneum, the lining membrane of the abdomen. Now divide or slit the vein about an inch, and you may if you choose slit the artery about the same distance from the renal arteries and the place where the aorta bifurcates. This I consider an essential part of my process. When the vein or artery are thus cut the animal will bleed. After having bled by opening the chest of the hog and incising the heart as described, it may be put in hot water and the bristles and hair removed in the usual way. The foul water from the scalding vat should then be washed from the chest. The next part of my process is, to insert an instrument or instruments which I will now describe. I would here state that these instruments though the best adapted to conduct my process with facility and despatch, I wish it understood that I do not intend to make any claim to their construction in this application.

The instrument shown in Figs. 3 and 4 of the drawings is a metallic tube with a flexible tube upon its anterior extremity, and upon or near its posterior extremity is a conical screw which when used to inject a hog is of size and shape as represented in the drawings. When used for cattle its proportions are suitably enlarged. This instrument can be used when the apex of the heart is divided at or near the line A of the drawings.

The flexible tube should be of such size as will fit closely the caliber of the aorta, or slightly distend it. When this instrument is used or inserted, the animal must be put in a convenient position, the chest opened by drawing apart the legs. The heart can then be brought to view; on elevating and viewing it upon the surface from which the point was cut, the appearance will be presented as shown in Fig. 2 of the drawings. Near the middle of the oval surface will be seen an irregular triangle opening marked B in the drawings. In order to learn the situation of the mouth of the main artery, it would be well to pass the finger into the hole marked B in the drawings, inclined a little to the left. In case of the hog it will be found to fit the finger closely so soon as it passes into the mouth of the main artery. In Fig. 3 I have shown the instrument inserted, which can be secured thus by one or two turns of the conical screw, the fluid cannot then regurgitate or pass the conical screw.

I will now describe another instrument which some may prefer using when the point of the heart is cut off. The tube of this instrument is made of metal slightly curved upon its anterior extremity to suit the curve of the aorta, upon the anterior extremity a fine screw thread is cut to a slightly elevated shoulder about half inch from the muzzle of the tube, upon this thread, a cupped leather made of buck skin or sheep skin is passed up to the shoulder, and then a small ferrule is screwed upon the extremity of the tube until it confines the posterior annular margin of the leather against the shoulder. In order that this tube armed with the cupped leather may be thrust into the mouth of the aorta without being turned or reflected back by the resistance of the sides of the arterial coats, a smooth thin ferrule of copper or silver or brass is slipped over the leather from behind forward, and extends as far as the anterior edge of the cupped leather. Attached to this sheath or ferrule is a flattened wire extending toward the posterior extremity of the tube, so that the ferrule can be readily drawn back from the cupped leather by pulling upon the posterior extremity of the wire when the mouth of the tube is introduced into the ascending aorta. Near the posterior end of the tube are two springs which have projecting sharp points which spreading apart stick into the muscular wall of the ventricle and prevent the tube from slipping from the artery—two hooks and a chain can be made to hold the pipe if preferred. The posterior end of the tube may be furnished with any of the known devices for attaching hose. The advantages of this instrument over the one before described are that when the cupped leather is thrust into the mouth of the ascending aorta, and passed up a short distance above the mouth of the coronary artery, when a fluid is injected through the pipe, the cupped leather will expand against the walls of the aorta and prevent the fluid from escaping through the coronary artery and its cut branches. Another instrument which I sometimes use and which affords great facility when the heart or its valves are in a healthy condition and which can only be used when the heart has not been wounded when bleeding the animal. This instrument is fashioned like a common straight round surgeon's trocar with this difference, that near the base of the cannula of the trocar, it is somewhat conical near the base, has a screw thread upon it, and the posterior end is elongated and fashioned so that the cannula can be readily attached to a hose.

When the animal is bled without wounding the heart as above described proceed to operate with the trocar thus—Introduce the trocar armed with a stiletto into the cavity of the left ventricle of the heart by puncturing its walls near the apex a little to the left; when it has entered the ventricle, engage the screw in the muscular walls of the heart and give the cannula two or three turns and then it can't slip out. Withdraw the stiletto, couple on the hose. The fluid being forced through the cannula fills the left ventricle and runs into the aorta, through the arteries of the whole body as well as those of the heart—but it cannot leak from the coronary artery because the heart is only wounded where the cannula enters, and the wound is of such kind that it cannot leak while the cannula remains in its position. The only difficulty attending the use of this instrument is that when the heart or its valves are diseased, they are liable to break down and let the fluid run into the pulmonary veins, and then if the lungs are diseased as is often the case the coats of the pulmonary veins give way, let the fluid run out into the chest and thus defeat the process of injecting.

The instrument which I insert when I inject the whole animal through the slit in the abdominal aorta is shaped like the letter T with one arm of the T longer than the other. The extremity of each arm is armed with a cupped leather and shield like the second described and the hose is coupled to the stem of the T. When this is to be used, if the animal is hanging by the hind legs, insert the long arm of the T into the slit in the aorta toward the hind legs, and then push it upward until the short arm of the T enters the artery; let it then slip down as far as it will, withdraw the shield from the leather, couple on the hose and inject. When you wish merely to inject the hams stop up the tube of the short arm of the T and insert the long arm toward the hams.

The next part of my process and which I consider essential, is to transmit a refrigerant and saline fluid, or a refrigerant fluid followed by a saline fluid. I proceed to do this as described in the following. A hose may conduct the fluid from a common forcing pump and the hose may be coupled to any of the instruments above described, or it would be more convenient where hogs, sheep or cattle are operated upon on a large scale, to have a tube or tubes brought down from an elevated resevoir, or from a tank containing the fluid to be injected which is done by making pressure upon it by an air pump. Each tube should have upon it a stop cock. When the fluid is thus forced into the arteries by its own gravity, or air pressure, or a force pump, it will run through the arteries, capillaries, and veins, return to the heart and escape from the right ventricle if the point of the heart is cut off, or from the una cara or pulmonary artery if they are punctured, slit or cut. When the fluid is transmitted both ways through the abdominal aorta, the fluid after traversing the capillaries and veins will flow away from both ends of the divided una cara. If the fluid is thrown only into that part of the aorta leading to the hams or rounds, the fluid will return and flow away from that portion of the cara which comes from the lower extremities. Even when the refrigerating fluid is at a temperature near zero it will at first return as warm as though the animal bled afresh. Where it runs away clear and cool and about a temperature of 40° then the animal heat is all carried off. It will be well in hot weather or in warm climates to continue the transmission of the saline fluid at that temperature a sufficient time to insure complete salting of the carcass which varies in the intensity of its action with the length of time the transmission is continued. When sufficiently salted the degree of cold may be greater before discontinuing the transmission of the refrigerant and saline solution.

I would here remark, that it is the better plan on first injecting, to use enough force to send a strong current into the arteries and after, it may run slow. The flesh takes the salt from the brine and makes it weaker, and the weak brine is displaced by the stronger solution. It is by this feature of my process that I am able to give any degree of saltness to the flesh while only a small quantity of brine is retained in the carcass. This I consider an essential part of my process.

In cold weather if great economy is esteemed essential, animals may be cooled by a very weak solution of brine or cold water and then the cold brine may be used until the water is displaced and the carcass is salted which can be readily told by tasting the flesh. This I consider essential.

Great economy of the refrigerant and saline fluid may be attained by placing the animal when operated upon, on a table constructed so that all the bloody pickle which escapes may be caught in a reservoir below it. From such vat or reservoir the bloody brine or pickle may run into a large kettle or suitable apparatus and boiled. The serous matter of the blood will coagulate by the heat, rise to the top of the hot brine, carrying with it all impurities. They can then be skimmed off and the brine concentrated by boiling it so that it will bear an egg when cold. By this result of my process all the brine can be used without any waste whatever. If it is desirable to merely cool and salt the rounds of beef or the hams of hogs, as is often the case when lard commands a high price in the market I proceed to conduct this part of my process thus: The abdomen is opened in or near the median line. If then I do not wish to salt the leaf lard it can be taken out, the descending colon being first cut off and tied up if desired, the intestines detached by cutting the mesentery carefully away from the backbone without wounding the aorta. When this is done you must not disturb the bladder or rectum until you have completed all you wish to accomplish by injecting. Then insert the pipe into the aorta just before it bifurcates to be distributed to the ham of either side. If you do not remove the leaf lard be sure that you do not insert the pipe in such manner as to inject the renal arteries. The arteries leading to each ham may then be injected with the saline and refrigerant fluid until cooled and salted. This part of my process is essential.

If the curer desires to add to the sweetness of the flesh, and assist the formation of the rich gravy so desirable in hams and bacon when cured, he may do it by injecting into the arteries of the entire animal, if a hog, or the hams, a solution of saccharin matter with salt, and with, or without being mixed with solutions of animal or vegetable gelatin starch or albumen. Such mixtures may be made so dilute as to pass the capillaries, or they may be made so thick and concentrated as to clog them and thus saturate the flesh. This I also consider an essential part of my process.

When the lard or tallow or suet of animals is to be used for manufacturing purposes and the smoky flavor forms no material objection to the tallow or lard of the animal, another part of my process which I will now describe is thus conducted. A quantity of pickle may be saturated or impregnated with the smoke or volatilized matters from burning or heated wood or corncobs and spices juniper berries or aromatics, by forcing the smoke or the volatilized matters to bubble through the pickle until it is sufficiently impregnated, which a person may be able to discover by tasting. This is a much more reliable antiseptic than the saline solution alone. The smoky pickle may be mixed with albumen or such amount of saccharine material as may be found desirable. This may follow the administration of a refrigerant fluid or be made refrigerant and then administered. Meat prepared in this way will be preferred by many to the ordinary smoked meats. If it is desirable not to apply this part of my process to the whole animal, but only to the rounds of beef or the hams of hogs, conduct the process as above described when that object is to be accomplished.

Another part of my process and which I deem essential should be conducted in the following manner. It is especially applicable in cases where the smoky flavor is not objectionable in flavoring the offal or lard or suet or tallow and can be also applied in the curing of hams or rounds after the tallow and suet or lard has been removed as above described. Smoking meats generally requires from twelve to fourteen days. By this part of my process it can be done in a very short time. A suitable quantity of wood of any sort or corncobs either coarsely or finely divided, may be ignited in a small stove by a spirit lamp, or if you wish to impart an agreeable aromatic flavor mix with the ignited material some juniper berries, black or red pepper, pimento or other aromatics, and then the warm smoke containing the volatilized matters from the ignited material may be drawn into a force pump or an instrument fashioned like a bellows and then injected until the hams or rounds or whole carcass is sufficiently impregnated with the smoke, which the curer can readily ascertain by tasting the flesh. This part of my process can be conducted as follows when done on a large scale. Inclose the corn cobs, wood, or aromatics, which may be varied in their proportions and character to suit the taste of the curer who may wish the flavor to suit different markets. The wood and aromatics may be coarsely or finely divided and mixed in varied proportions. The vessel should be made of iron with an opening for charging and discharging its contents with an aperture near the bottom, or in such position as will not cause too much agitation in the contents when the air is forced through the vessel by a pump or bellows or drawn through by the same means. A seive cloth must be placed in the vessel above the material to prevent any solid matter from being forced out by the current of air. In the top of the vessel and above the wire cage a tube should be conducted. If desirable the tube may be coiled in the form of a worm and brought out from the bottom of a vessel containing water. The water in which the coil is immersed may be heated to such temperature that the volatilized matters passing through the coil may not be condensed, but kept at such degree of heat that the smoky vapors will not burn the vessels or heat the flesh injuriously. When the vessel containing the wood and aromatic substances is heated from without, the smoke and volatilized matter will be forced by the air injected, into the lower aperture to pass from the pipe at the top, go through the worm and then be conducted by hose to the animal and be forced through the arteries, capillaries and veins. The water in which the worm is immersed may be kept at such temperature as will permit condensation of the volatilized matter and at the same time cool the air or gases or volatilized material so that their heat will do no injury. This part of my process may precede the use of the refrigerant and saline fluid or may be employed subsequent according to the ideas of the curer.

Having thus described those parts of my process which relate to the transmission of fluids or injecting of animals I will here remark that there is a wide difference in the results of my process from that of any other. All experiments heretofore made to cure the flesh of animals by injecting the saline solutions into the vascular system have stopped short of having attained sufficient certainty in their application to make them generally useful. It seems that the great cause of difficulty has been altogether overlooked. The results of my experience are, that merely filling the arterial and capillary system of an animal with a solution of salt however cold does not preserve the flesh, because the animal heat will not be carried off and the cold solution does not contain enough salt to keep the flesh. If the solution contains enough salt it must be kept hot and injected in that state; in that case the flesh will also sour because the warmth of the body and the saline solution cause the salt to accelerate decomposition and it sours. The salt may however operate to check the sourness from running into the putrefactive state. By my process the saline solution is not used until the arterial capillary and venous system are nearly filled, but the saline solution is transmitted until the heat is carried off and the flesh has become salted by the flesh absorbing it from the solution and then a new quantity of saline solution displacing that weakened by the abstraction of the salt. It will be seen plainly how upon the principle of displacement, I am enabled to give any desired degree of saltness by the displacing action of fresh currents of the saline solution and at the same time permitting the salt acting as an accelerator of decomposition by removing the heat.

When animals have been thus operated upon as above described, the intestines or such parts of them as have been allowed to remain, may be taken away, or the skin removed, or the skin may be removed previous to smoking, but I would not advise its removal previous to the use of the saline solution. The animals should not be dismembered until all is completed which is to be accomplished by injection. When this is done, and the bowels removed, you may then cut up the carcass, rub the pieces with salt that it may act with greater intensity upon those surfaces exposed to the air. It may then be smoked in the ordinary way or be packed in barrels.

The refrigerant fluid used in my process may be made in various ways to suit the convenience of the curer or be adapted to the scale upon which he may choose to operate. I would recommend however that all the saline solutions used for injecting should be boiled for the purpose of expelling the air from the water, and making it clear. It should then be strained through flannel before being used. When the saline solutions are cooled, the solutions of gelatin or albumin may be mixed in such proportions as may be needed. The saline solutions may then be made refrigerant by a mixture of salt and ice surrounding the containing vessel or in southern countries the pickle used, may be cooled by the use of a pump and an evaporating fluid. In cold weather the pickle if cooled by the atmosphere will answer very well. Cold water may be used as a refrigerant, but should always be followed by a cold antiseptic solution. This I regard as an essential part of my process. It is economical to inject the fluid cold as possible and cease injecting or transmitting the fluid when the body is cooled to the temperature required by the state of the weather or climate. In warm weather and in warm climates I would not advise the use of cold water as a refrigerant, but in warm climates, and in warm weather, I would advise the use of the saline refrigerating fluid and in all cases where you design making smoked meats I would use the smoky pickle. Or an excellent substitute for the smoky pickle may be made by a mixture of salt, sugar or molasses dissolved and boiled in water. When cool a sufficient quantity of creosote or wood naphtha may be added and used cold or refrigerant. This can be used in cases when you wish to make smoked meats in the ordinary way and is much more powerful antiseptic than a solution of salt alone.

I am aware that the arteries of animals have been injected with saline and aromatic solutions in such manner as to fill the capillaries and veins for the purpose of curing and flavoring the flesh. But I am not aware that saline fluids have ever been transmitted in a current through the arteries capillaries and veins so as to insure permanent action of the saline matters upon the flesh, nor am I aware that refrigerant or fluids have ever been used or injected for the purpose of abstracting the animal heat, nor am I aware that that object has ever been accomplished by injection. Consequently I do not claim the filling the arteries capillaries and veins of animals with saline or aromatic solutions *per se*. I am also aware that animals have been killed by knocking on the head and then wounding the heart by a knife thrust from above the sternum or through the parietes of the chest in such manner as necessarily to wound important arterial branches and divide the extremely vascular tissues of the lung. But I am not aware that animals have ever been bled or slaughtered by cutting in the median line or opening the chest and then wounding the heart or its vessels, nor am I aware that animals have ever been bled by opening the abdomen and then incising the una cara or aorta. Consequently I do not claim bleeding the animal by wounding the heart *per se*.

I claim—

1. Preparing carcasses for injection, and injecting the same in the manner set forth.

2. I also claim injecting or transmission of the saline solution at a temperature below or above the freezing point or thereabouts as set forth so that the flesh may be cooled from within outward.

3. I claim the injection of portions of the carcasses as well as the whole beast with the solutions indicated, in the manner set forth.

NATHAN B. MARSH.

Witnesses:
W. CHEDSEY,
EUGENE DAYLOR.